UNITED STATES PATENT OFFICE.

JOSEPH LONES, OF SMETHWICK, ENGLAND, ASSIGNOR OF TWO-THIRDS TO JABEZ LONES AND EDWARD HOLDEN, OF SMETHWICK, ENGLAND.

PROCESS OF MAKING PIGMENTS.

SPECIFICATION forming part of Letters Patent No. 707,434, dated August 19, 1902.

Application filed December 5, 1901. Serial No. 84,816. (No specimens.)

*To all whom it may concern:*

Be it known that I, JOSEPH LONES, a subject of the King of Great Britain, residing at No. 93 Regent street, Smethwick, England, have invented a certain new Process of Manufacturing Pigments, of which the following is a specification.

This invention relates to certain new and useful improvements in a process for the manufacture of pigments from zinc ore or other compounds or mixtures containing zinc.

I will describe the said invention as applied to the manufacture of a white pigment from ores of zinc.

I pulverize the ore and roast it. If the ore operated upon be a sulfid, such as the native sulfid of zinc called "blende," the heating is effected with free access of air. If the ore is calamin, it simply requires to be heated, the free access of air being unnecessary.

In treating blende to produce therefrom a white pigment according to the process constituting my invention I proceed as follows: I take the blende and calcine it in a muffle-furnace with free access of air, by which means the sulfur is given off mainly in the form of sulfur dioxid and the roasted blende is converted into zinc oxid. The gases resulting from the calcination of the blende are passed through a chamber containing red-hot coal or coke, together with water-vapor. By this treatment the sulfur dioxid is converted into sulfureted hydrogen, which is utilized in the manner hereinafter described. I then dissolve the crude oxid of zinc in strong hot acetic acid, and when the acid has taken up the maximum amount of oxid of zinc the solution is allowed to settle and the clear liquid is decanted off. I have found in practice that about five pounds of the hot acetic acid dissolves about one pound of the calcined ore. To the clear liquid is added sheet-zinc, which precipitates any lead that the zinc ore may have contained and which the acetic acid may have dissolved. The precipitated lead is in the form of a sponge and collects on the zinc plates and can be removed therefrom from time to time. The liquid is then cooled to allow the zinc acetate to crystallize out. These crystals are separated from the liquid and dissolved in water and the sulfureted hydrogen formed during the calcination of the ore passed into the liquid, and the whole of the zinc contained in the liquid is thereby precipitated in the form of sulfid of zinc. The zinc sulfid is then filtered, dried, and heated with free sulfur out of contact with air. The precipitated zinc sulfid is heated out of contact with air with sulfur first to drive off water of crystallization, as until this is done zinc sulfid, although a white salt, cannot be ground up with oil into a pigment, and the added sulfur has for its object to prevent the oxidation of any of the zinc sulfid by combination when heated with air in the crucible. A white pigment consisting of zinc sulfid is thus manufactured.

In the process described the acetic acid can be used again after the removal of the dissolved zinc.

What I claim as my invention, and desire to secure by Letters Patent, is—

1. A process of manufacturing white pigments from zinc ores which consists in converting the ore into crude zinc oxid, suitably dissolving the oxid to form a solution of acetate of zinc, precipitating from the said solution any lead which may be contained therein, crystallizing out of the solution zinc acetate, suitably dissolving the crystals, precipitating from the said solution zinc sulfid, and then suitably treating the zinc sulfid to form a pigment.

2. A process of manufacturing white pigments from ores or compounds containing zinc which consists in heating the zinc ore so as to convert it into crude zinc oxid, dissolving the said zinc oxid in strong hot acetate acid so as to form a solution of acetate of zinc, then precipitating from the clear liquid any lead which the zinc ore may have contained and which the acetate acid may have dissolved, by the addition to the solution of sheet-zinc, crystallizing out of the solution zinc acetate, dissolving the crystals in water, passing sulfureted hydrogen into the solution thereby precipitating the zinc as zinc sulfid and then treating the zinc sulfid with free sulfur out of contact with air forming thereby a white pigment.

In testimony whereof I have hereunto set my hand in presence of two subscribing witnesses.

JOSEPH LONES.

Witnesses:
 RICHARD SKERRETT,
 ARTHUR JOHN POWELL.